W. R. SINK.
LOCK FOR STEERING GEARS.
APPLICATION FILED SEPT. 12, 1916.

1,249,680.

Patented Dec. 11, 1917.

WITNESSES

INVENTOR
William R. Sink
BY
ATTORNEY

UNITED STATES PATENT OFFICE.

WILLIAM R. SINK, OF FORT COBB, OKLAHOMA.

LOCK FOR STEERING-GEARS.

1,249,680.     Specification of Letters Patent.     Patented Dec. 11, 1917.

Application filed September 12, 1916. Serial No. 119,676.

*To all whom it may concern:*

Be it known that I, WILLIAM R. SINK, a citizen of the United States, residing at Fort Cobb, in the county of Caddo and State of Oklahoma, have invented certain new and useful Improvements in Locks for Steering-Gears, of which the following is a specification.

This invention relates to steering gear for motor driven vehicles, and has more particular reference to an improved attachment therefor, whereby the steering wheels of the vehicle may be maintained in an adjusted position.

The invention has for its principal object, the provision of a device of the character stated, whereby should the driver of the vehicle leave the same, the steering wheels may be turned toward the curbing and locked in such position by my improved attachment, thus preventing the theft of the vehicle; also, the attachment may be used to lock the steering wheels in such position as will allow the vehicle to traverse an unswerving course.

Among the aims and objects of the invention may be recited, the provision of an attachment of the character mentioned with a view toward practicability, and in which the number of parts are few, the construction simple, the cost of production small, and efficiency of operation high.

Other and further improvements and novel details in the construction and arrangement of parts will be appreciated from the description to follow, which for a clear understanding of the invention should be considered in connection with the accompanying drawings, which form a part hereof and wherein the preferred embodiment of the invention is shown for the purpose of illustration.

In the drawings:—

Figure 1:
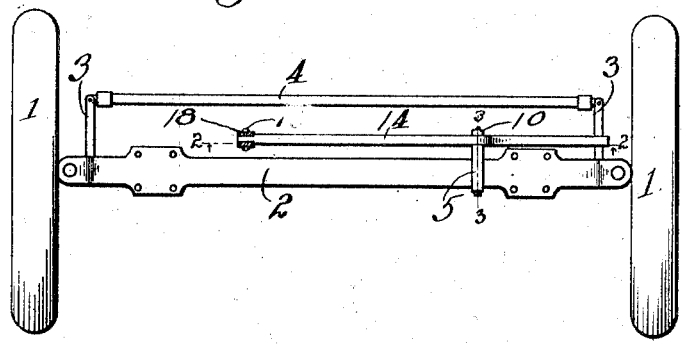
Figure 1 is a plan of the usual steering gear with my improved attachment applied thereto.
Figure 2:
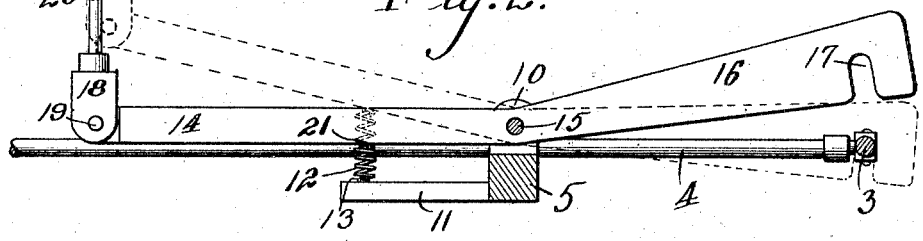
Fig. 2 is a side elevation of the improved locking attachment.
Figure 3:
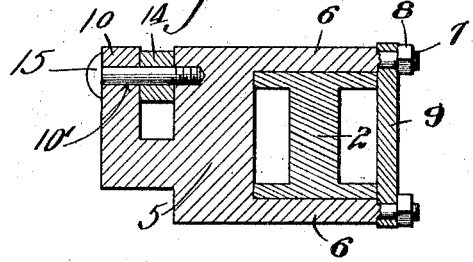
Fig. 3 is a transverse section taken on the line 3—3 of Fig. 1.

With more particular reference to the drawings, wherein like reference numerals refer to corresponding parts throughout the several views, it may be stated that the steering wheels are indicated by the numeral 1, the front axle by the numeral 2, the steering knuckles by the numeral 3 and the connecting rod to which the steering gear is attached by the numeral 4. Referring now to the present improvement, I secure to the axle 2, a bracket 5 having bifurcated leg portions 6, the outer extremities of which are screw threaded and reduced as at 7 and have turned into engagement therewith, locking nuts 8. In applying the bracket 5 to the axle, the leg portions 6 embrace the top and bottom portions thereof and as shown to advantage in Fig. 3, the reduced portions 7 extending slightly beyond the said axle, thus, permitting a locking plate 9 having suitable openings arranged within the opposite end portions thereof, to be arranged thereupon, whereas, the locking nuts 7 are then turned into engagement therewith and constitute an efficient locking means therefor, whereby accidental displacement will be prevented, also eliminating any possible lateral movement of the bracket upon the axle. Upon the remaining end of the bracket 5, I form a substantially right angularly extended arm 10 and arrange within the upper portion thereof, a transverse opening 10′, the purpose of which will subsequently be apparent. A laterally extended arm 11 is arranged upon one side of the bracket 5 adjacent the base thereof and receives thereon, a contractile coiled spring 12, which spring is affixed thereto by means of a staple as shown at 13.

A lever 14 of substantially bell crank formation is pivotally supported between the right angularly disposed arm 10 and the adjacent end of the bracket 5 by means of a bolt 15 which is passed through the opening 10′ arranged in the upper portion of the arm 10 and into engagement with a threaded recess arranged within the said adjacent end of the bracket 5. It is to be noted that one end of the lever 14 is broadened as at 16 and has formed therein a transversely extending recess 17. The remaining end of the lever is reduced and has pivotal connection with the yoke 18, as at 19, the yoke 18 being carried by a rod 20 which in turn is connected with a suitable foot lever (not shown) which is so arranged as to be readily accessible to the operator of the vehicle.

To provide for means whereby the broadened portion 16 of the lever may be normally held out of engagement with the adjacent steering knuckle 3, the contractile coiled spring is connected with the opposite end thereof as at 21, and, as will be obvious, serves to maintain the lever 14 in an inoperative position.

In operation, and assuming that the bracket 5 has been adjusted to the proper position, the steering wheels 1 are turned in position facing the curbing of the street, with the wheels thus adjusted, the foot lever hereinbefore described, is then engaged by the foot of the operator and actuated so as to cause the rod 20 to be retracted. It will be apparent, that such movement of the rod will cause the broadened end 16 of the lever 14 to be moved downwardly and that the recess 17 arranged adjacent the outer extremity thereof will engage with the adjacent one of the steering knuckles 3, and thus lock the steering wheels 1 against further movement. If desired, a suitable locking element may be engaged with the foot lever whereby the same may be held in its depressed position, and consequently, further actuation thereof may be prevented. However, this forms no part of the present invention and is not to be construed as a limitation. When it is desired to release the steering wheels in order that the vehicle may be guided into its proper course, the foot lever is raised whereupon the rod 20 will be moved downwardly, the contractile spring 12 assisting such movement and permitting the notched portion 17 to be withdrawn from engagement with the particular steering knuckle with which it was engaged. In the event that the operator should desire to use the locking attachment as means for maintaining the vehicle in a straightaway course, the bracket 5 is adjusted to the proper position, that is to say, in such position that the notched portion 17 of the lever 14 will engage with its particular steering knuckle, only when the said steering knuckle is in the position assumed thereby when the steering wheels are straight. Thus, when the vehicle is traveling and the operator is desirous of maintaining the same in the straight ahead course, the foot pedal is actuated in the manner as heretofore described and the notched portion 17 of the lever 14 again engaged with its respective steering knuckle, locking the steering wheels in the desired position.

I desire to have it understood, that the bracket 5 may be adjusted in any position along the bolster 2 in order that the pitch of the steering wheels 1 may be adjusted to the desired position for locking.

I therefore particularly point out and distinctly claim as my invention:—

1. In a locking device for steering wheels of vehicles, the combination with the steering gear, axle, and knuckle, of a bracket adjustably mounted upon the axle, a lever pivoted in said bracket and having a recess at one extremity thereof said recess being adapted to engage the knuckle whereby the same is maintained in an adjusted position, a connecting rod joined to the remaining end of the lever, and a contractile spring carried upon a laterally offset arm arranged upon said bracket and connected with one portion of said lever for normally maintaining the lever in an inoperative position.

2. In a locking device, the combination with the axle and a knuckle of a vehicle, a bracket having an arm, the bracket being adjustably mounted on the axle, a lever fulcrumed on the bracket, the lever being adapted to engage and lock the knuckle, means disposed between the bracket arm and the lever for holding the lever from engagement with the knuckle, and a connection joined with the lever for moving the lever into the knuckle engaging position.

In testimony whereof I affix my signature in presence of two witnesses.

WILLIAM R. SINK.

Witnesses:
C. W. LUDWICK,
D. R. JACKSON.